March 20, 1945. H. G. VOIGHT Re. 22,622

DOOR LOCK

Original Filed July 12, 1940 2 Sheets-Sheet 1

Inventor

Henry G. Voight

By Bochnell & Pritchard

Attorneys

March 20, 1945. H. G. VOIGHT Re. 22,622

DOOR LOCK

Original Filed July 12, 1940 2 Sheets-Sheet 2

Inventor

Henry G. Voight

By Rockwell & Barthelow

Attorneys

Reissued Mar. 20, 1945 Re. 22,622

UNITED STATES PATENT OFFICE 22,622

DOOR LOCK

Henry G. Voight, Hamden, Conn., assignor to Sargent & Company, New Haven, Conn., a corporation of Connecticut Original No. 2,272,101, dated February 3, 1942, Serial No. 345,109, July 12, 1940. Application for reissue August 21, 1943, Serial No. 499,490

8 Claims. (Cl. 70—151)

This invention relates to door locks or latches, and more particularly to a lock for a front door of a building, although it will be understood that it may be employed in any location in which is desired a lock having the characteristics embodied in the present structure.

The invention relates particularly to a so-called tubular lock, or a lock having a tubular or cylindrical casing which may be inserted through a cylindrical opening made in the edge of the door. Such locks must comprise a relatively small number of parts, and the mechanism thereof must be relatively simple in order that it may be housed in the relatively small space available in the cylindrical case.

A front door lock or latch is usually provided with a latch bolt which is prevented from being forced by a tool inserted between the door and jamb by a dogging member which engages behind the head of the latch bolt, the dogging member in turn being controlled by a plunger which engages and is held in retracted position by the strike plate of the lock. Also in a lock of this character it is desirable to be able to dog the outside knob, so that the latch bolt may not be retracted from the outside by means of the knob, while at the same time providing key-operated means at the outside of the door for retracting the latch bolt.

When the door is "on latch" or when the outside knob is dogged, it is desirable that the inside knob be free to turn to retract the latch bolt, and also desirable that the latch bolt may be free for retraction by contact with the strike plate in order that the door may be closed. In order to provide all of these functions in a so-called tubular lock, it is necessary to arrange the required mechanism in compact relation, as well as to use the smallest possible number of parts.

One object of the above invention is the provision of a door lock of the character described which comprises a relatively small number of parts and which may be arranged in a compact space whereby the lock mechanism may be carried in a tubular case.

A still further object of the invention is the provision of a front door lock having all of the functions required of a lock for this location, the mechanism of which is so arranged that it may be housed in a tubular or cylindrical case.

A still further object of the invention is the provision of a door lock having a latch bolt which is held in protracted position when the door is closed by a dogging member, the dogging member being controlled in turn by a dog-controlling plunger, and providing a slide within the lock and adjacent the bolt stem or yoke, which slide acts to move the dog to inoperative position, and which slide is itself actuated by the rollback of either the inner or outer knobs.

A still further object of the invention is the provision of a door lock of the character described in the preceding paragraph, in which the outer knob may be dogged against turning by mechanism at the inside of the door, and providing a key-operated lock in the outer knob which actuates the spindle of inner knob so that the latch bolt may be retracted from the outside of the door by the proper key.

To these and other ends the invention consists in the novel features and combinations of parts to be hereinafter described and claimed.

Figure 1:
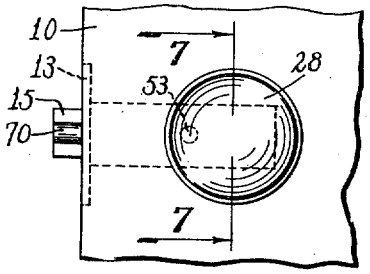
Fig. 1 is a front elevational view of a fragmentary portion of a door provided with a lock embodying my invention.
Figure 2:
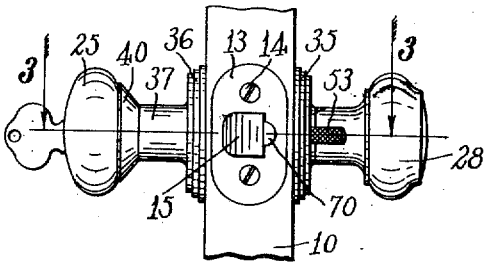
Fig. 2 is an edge view of the parts shown in Fig. 1.

To illustrate a preferred embodiment of my invention I have shown a fragmentary portion of a door 10 upon which is mounted my improved lock, comprising casing portions 11 and 12 having a front plate 13 secured to the part 12, and which plate is in turn secured to the door by the screws 14. The casing portions 11 and 12 are secured together by means of the screw 12a, shown more especially in Fig. 3. The plate 13 is provided with an opening through which extends the latch bolt 15 carried at the forward end of a yoke or stem 16 slidably carried in the lock casing. As shown, the yoke 16 is bifurcated, and each leg thereof is provided with a laterally turned portion 17, and a shoulder 18 spaced forwardly of the portion 17. As will be explained later, the laterally turned portions or lugs 17 are designed to be operated by the roll-backs of the inner and outer knobs to withdraw or retract the latch bolt in the usual manner.

Figure 3:
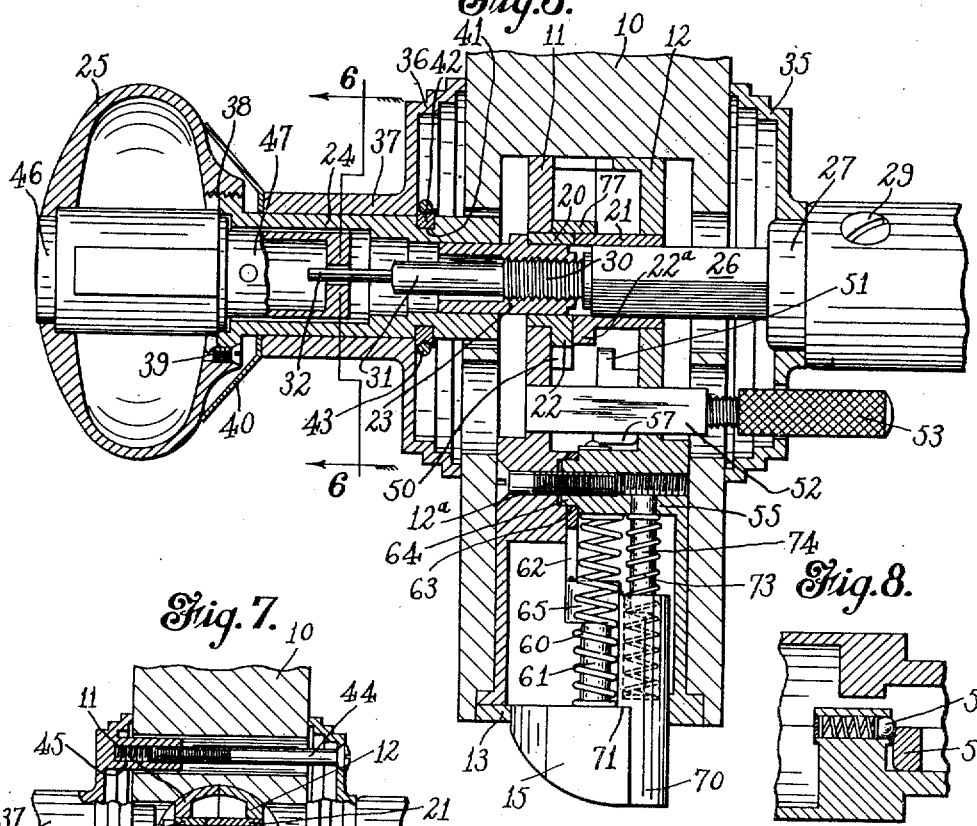
Fig. 3 is a sectional view on line 3—3 of Fig. 2.
Figure 4:
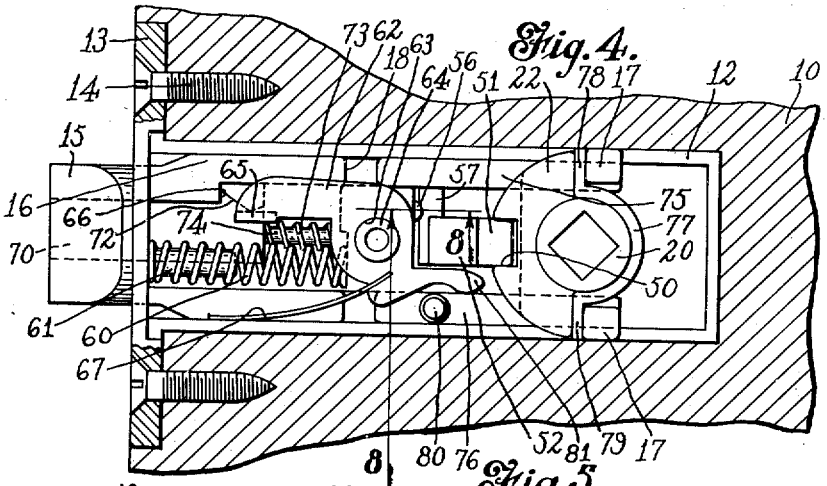
Fig. 4 is a view of the lock with the cover of the case removed to show the interior mechanism.

The casing portions 11 and 12 are provided with openings in which are rotatably mounted hubs 20 and 21, which hubs carry rollbacks 22 and 22a, respectively, these rollbacks standing forwardly of the lugs 17 on the bolt stem. As shown in Figs. 3 and 4, the hub 20 is provided with a polygonal opening to receive a correspondingly shaped spindle 23, which spindle is in turn received in a polygonal opening in the inner end of the shank 24 of the outer knob 25. The hub 21 receives a polygonal spindle 26 which is threadedly received in the shank 27 of the inside knob 28, the knob shank being secured against rotation on the spindle when it is properly positioned thereon by means of the set screw 29. As shown in Fig. 3, the spindle 26 of the inside knob is provided with a stem extending into and through the spindle 23 of the outside knob, this stem comprising a streaded portion 30 which threadedly and rotatably engages the spindle 23, a shank portion 31 and a flattened end portion 32, the purpose of which will be explained hereinafter. It will be understood that the inner spindle 26 is at all times rotatable independently of the spindle 23 of the outside knob 25.

Figure 7:
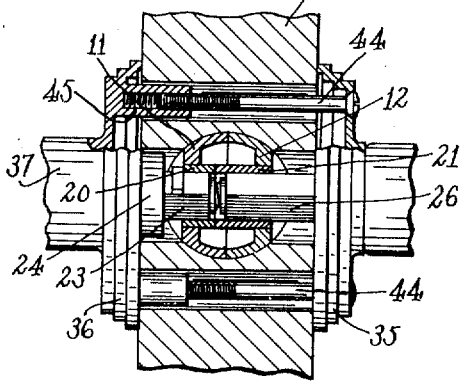
Fig. 7 is a sectional view on line 7—7 of Fig. 1.
Figure 8:
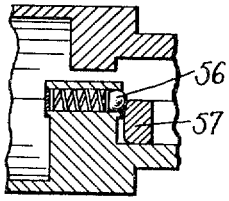
Fig. 8 is a sectional view on line 8—8 of Fig. 4.

At the inside of the door is mounted the rose 35, while a similar rose 36 is mounted at the outside of the door, the latter carrying a tubular portion 37 which rotatably receives the knob shank 24. The knob 25 is threadedly secured upon the knob shank, as shown at 38, a set screw 39 locking the parts against rotation, which screw is covered by a shield 40 disposed between the tubular portion 37 of the rose and the knob. Also, as shown in Fig. 3, the shank 24 is provided with an annular recess 41 within which are received keys 42 of annular semi-circular form, the keys being held in the recess by a split ring 43 so as to secure the knob shank and knob within the portion 37 of the rose. It will be understood that after the spindle comprising the outer portion 23 and inner portion 26 is positioned within the door, the outer knob and rose may be placed against the side of the door, with the spindle portion 23 received in the knob shank, and the parts secured in place by screws 44 (Fig. 7) passed through the inner rose 35 and secured in threaded lugs 45 carried by the outer rose, thus securing the outer rose and knob to the door with the knob free to rotate in the portion 37.

Figure 6:
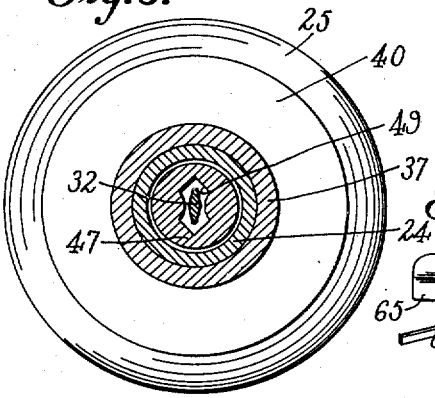
Fig. 6 is a sectional view on line 6—6 of Fig. 3.

As also shown more particularly in Figs. 3 and 6, a key-operated lock 46, which may be of the ordinary pin tumbler type, is provided in the outside knob 25, this lock having a rotatable key plug or barrel 47 within the knob shank 24, this barrel having at its inner end an elongated opening 49 which loosely receives the flattened end portion 32 of the inner spindle. The relative size and shape of the opening 49 and spindle 32, as will be seen from Fig. 6, will allow partial rotation of one of these parts without affecting the other; that is to say, there is a certain amount of lost motion between the two. As the spindle portion 32 is secured to the inner spindle, which is in turn fixed to the inner knob 28 by means of the screw 29, this lost motion will permit sufficient rotation of the inner knob to retract the latch bolt without movement of the key plug 47. However, when the key plug 47 is rotated, it will, after a small initial movement, pick up the member 32 and through it effect rotation of the inner spindle 26 and thus retract the latch bolt.

Figure 5:
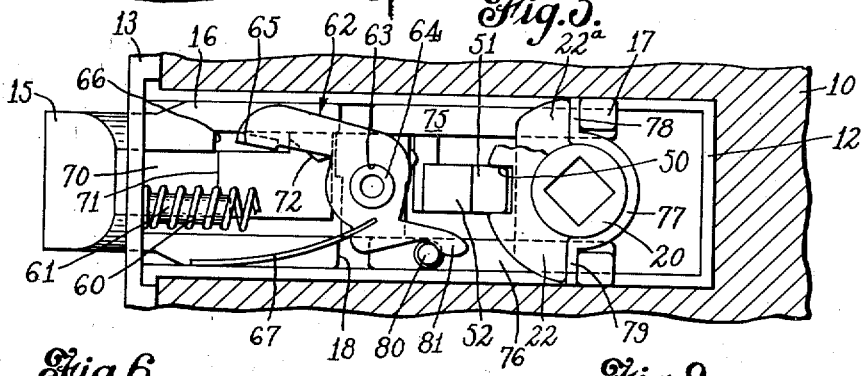
Fig. 5 is a view similar to Fig. 4 but showing the parts in another position.

From reference to Figs. 4 and 5 it will be observed that the rollback 22 is larger than the rollback 22a, so as to project forwardly therefrom, and this forwardly projecting portion is provided with a notch or recess 50 adapted to receive a detent 51 on a dogging plunger 52 movably mounted in the casing portions 11 and 12, and having threadedly secured thereto a button or fingerpiece 53 projecting through the rose 35 at the inside of the door. By manipulating the member 53, the plunger may be pushed inwardly or pulled outwardly to effect engagement or disengagement of the detent 51 in the notch 50. This serves to dog the hub 20 carrying the rollback 22, and therefore dogs the outside knob against turning, while leaving the inside knob free to turn. It will be understood that this dogging mechanism is shown in inoperative position in Fig. 3, and to move it to operative position it is only necessary to push inwardly on the member 53 so as to move the plunger 52 to the left, as shown in this figure.

The portion 12 of the lock case is provided with a post 55 which receives the screw 12a, and within this post is mounted a spring-pressed ball detent 56 which engages a member 57 secured to the dogging plunger 52 to releasably hold this plunger in its outer or inner positions to which it may be moved.

Figure 9:
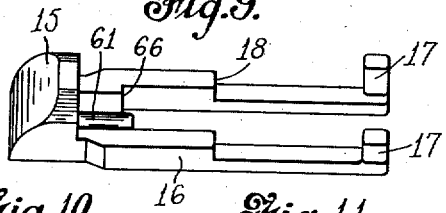
Fig. 9 is a perspective view of the latch bolt and yoke or stem attached thereto.
Figure 10:
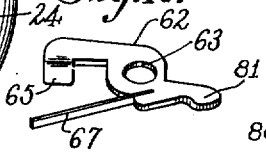
Fig. 10 is a perspective view of the latch-dogging member.

The latch bolt shown in Fig. 9 is normally urged to projected position by means of a spring 60 acting against the post 55 and received upon a member 61 secured to the latch bolt. In order that the latch bolt may be dogged against being forced when the door is closed, a dogging member 62 is provided, which dogging member has an opening 63 within which is received the reduced upper end 64 of the post 55 to pivot the dogging member thereon. This member is provided with a laterally turned end or detent portion 65, which when in operative position engages behind a shoulder 66 on one of the legs of the yoke or stem of the latch bolt. This dogging member 62 is normally urged to operative position by the spring 67, one end of which engages the dogging member below the pivot and the other end of which bears against the lock casing.

Figure 12:
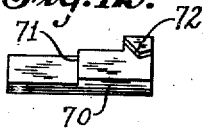
Fig. 12 is a perspective view of the dog-controlling plunger.

In order to hold the latch dogging member in inoperative position when the door is opened so that the bolt may be retracted by contact with the strike, a dog-controlling plunger 70 is provided, which plunger, as shown more especially in Figs. 3 and 12, is provided with a shoulder 71 engaging behind the head of the latch bolt, and a cam member 72 adapted to engage above the portion 65 of the dogging member 62, this dog-controlling plunger being normally held in projected position, shown in Fig. 3, by a spring 73 received within an opening in the plunger and carried by a post 74 secured to the post 55. As will be seen from Figs. 4 and 5, when the door is opened and the plunger is projected behind the latch bolt, as shown in Figs. 3 and 4, the cam portion 72, by engaging the laterally turned end 65 of the dogging member 62, holds the dogging member downwardly against the tension of the spring 67 so that the laterally turned end 65 does not engage behind the shoulder 66. When, however, the door is closed the dog-controlling plunger 70 is held in retracted position by contact with the strike, as shown in Fig. 5, and the cam 72 is moved out of engagement with the member 65, allowing the spring 67 to move this member upwardly behind the shoulder 66, and thus prevent the forcing of the latch by a tool inserted between the door and the jamb.

Figure 11:
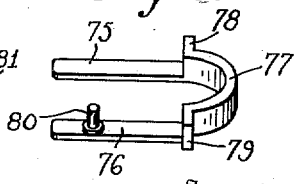
Fig. 11 is a perspective view of the auxiliary yoke or stem which releases the dogging member.

It is, of course, necessary to provide means for moving the dogging member 62 to inoperative position when it is desired to retract the latch by either of the knobs or by a key. To effect this result an auxiliary bolt stem or yoke is provided, as shown in Fig. 11. As illustrated this member comprises leg portions 75 and 76 connected at their rear ends by the arcuate-shaped member 77, which member is provided with laterally extending ears 78 and 79. This member is adapted to lie over the legs of the bolt stem 16 between the shoulders 18 and the lugs 17, whereby the portions 78 and 79 lie against the lugs 17, and between these lugs and adjacent surfaces of the rollbacks 22 and 22a. The leg 76 of this member carries a pin 80 which is adapted to engage the tail 81 of the dogging member 62, whereby when this auxiliary stem is retracted or moved to the right, as shown in Figs. 4 and 5, the tail piece 81 is moved upwardly, thus swinging the member 62 to move the detent portion 65 to inoperative position.

It will be observed that the free end portions of the members 75 and 76 do not contact the shoulders 18 when the members 78 and 79 are against the lugs 17, but on the other hand there is a lost-motion connection between these two parts. Thus if, when the door is closed and the parts are in the position shown in Fig. 5, it is attempted to force the latch bolt 15, the retraction of the latch bolt will be arrested by the member 65 before the shoulders 18 strike the forward ends of the legs 75 and 76, so that the retraction of the latch bolt is arrested before any movement of the dogging member 62 by the pin 80. It will also be apparent that the members 78 and 79 lie in front of both rollbacks 22 and 22a, the portion 77 embracing the hubs 20 and 21, so that whether the latch is operated by means of the inside knob, the outside knob, or by means of the key (which operates the inside knob spindle), the auxiliary stem or yoke will be actuated and will "kick off" the dogging member 62.

It will also be apparent that the plunger 52 may be moved to the left from the position shown in Fig. 3 until the detent 51 engages in the notch 50 to dog the hub 20 and prevent the opening of the door by the outside knob. At this time the latch will be free for operation by the inside knob, this being permitted by the lost-motion connection between the spindle portion 32 and the opening at the forward end of the key plug 47. At the same time the key plug is connected to the spindle 26 of the inside knob, so that by means of the key, the key plug may be rotated, and rotate the spindle 26 to retract the latch bolt.

Thus I have been enabled to provide with a minimum number of parts and within a compact space a door lock which has all the functions required of the usual front door lock, and which may be contained within a tubular case so that it may be readily mounted upon a door without time-consuming mortising operations.

While I have shown and described a preferred embodiment of my invention, it will be understood that it is not to be limited to all of the details shown, but is capable of modification and variation within the spirit of the invention and within the scope of the appended claims.

What I claim is:

1. In a door lock, a case, a latch bolt reciprocably mounted in the case, a bifurcated yoke connected to said bolt, said yoke having lugs at a rear portion thereof and shoulders spaced from said lugs, a dogging member pivotally mounted in the case and adapted to engage said bolt to dog the same against retraction when the door is closed, an auxiliary yoke mounted on said bolt yoke between said lugs and shoulders, and having portions abutting said lugs, and knob-operated rollbacks in the case adapted to engage said last-named portions to move said auxiliary yoke and said bolt yoke rearwardly to retract the bolt, and said auxiliary yoke having a part engaging said dogging member to move the latter to inoperative position.

2. In a door lock, a case, a latch bolt reciprocably mounted in the case, a bifurcated yoke connected to said bolt, said yoke having lugs at a rear portion thereof and shoulders spaced from said lugs, a dogging member pivotally mounted in the case and adapted to engage said bolt to dog the same against retraction when the door is closed, an auxiliary yoke mounted on said bolt yoke between said lugs and shoulders, and having portions abutting said lugs, and knob-operated roll-backs in the case adapted to engage said last-named portions to move said auxiliary yoke and said bolt yoke rearwardly to retract the bolt, said auxiliary yoke having a part engaging said dogging member to move the latter to inoperative position, said casing being of tubular form and insertable through an opening in the edge of the door.

3. In a door lock, a case, a latch bolt reciprocably mounted therein, inner and outer coaxial independently rotatable spindles, a knob upon each of said spindles, means for dogging the outer knob against operation, a key-operated lock mounted in the outer knob, means connecting each of said spindles to the bolt for operating the latter, said outer spindle being hollow, and means rigidly secured to the inner spindle and extending through, and threadedly connected with, the outer spindle for connection with said lock whereby the latter may operate the inner spindle when the outer knob is dogged.

4. In a door lock, a case, a latch bolt reciprocably mounted therein, inner and outer coaxial independently rotatable spindles, a knob upon each of said spindles, means for dogging the outer knob against operation, a key-operated lock mounted in the outer knob, means connecting each of said spindles to the bolt for operating the latter, said outer spindle being hollow, means rigidly secured to the inner spindle and extending through, and threadedly connected with, the outer spindle and having a lost-motion connection with said lock whereby the latter may operate the inner spindle when the outer knob is dogged, and the outer knob may have a limited rotation independently of the inner spindle.

5. In a door lock, a case, a latch bolt reciprocably mounted in the case, a bifurcated yoke connected to said bolt, said yoke having lugs at a rear portion thereof and shoulders spaced from said lugs, a dogging member pivotally mounted in the case and adapted to engage said bolt to dog the same against retraction when the door is closed, an auxiliary yoke mounted adjacent said bolt yoke between said lugs and shoulders and having portions abutting said lugs, a knob-operated rollback in the case adapted to engage said last-named portions to move said auxiliary yoke and said bolt yoke rearwardly to retract the bolt, said auxiliary yoke having a part engaging said dogging member to move the latter to inoperative position, and said shoulders being spaced from the adjacent end of the auxiliary yoke whereby inward pressure upon the bolt when the latter is dogged will effect engagement of the bolt with said dogging member before effecting movement of the auxiliary yoke.

6. In a door lock, a case, a latch bolt reciprocably mounted in the case, a bifurcated yoke connected to said bolt, said yoke having lugs at a rear portion thereof and shoulders spaced from said lugs, a dogging member pivotally mounted in the case and adapted to engage said bolt to dog the same against retraction when the door is closed, an auxiliary yoke mounted adjacent said bolt yoke between said lugs and shoulders and having portions abutting said lugs, a knob-operated rollback in the case adapted to engage said last-named portions to move said auxiliary yoke and said bolt yoke rearwardly to retract the bolt, said auxiliary yoke having a part engaging said dogging member to move the latter to inoperative position, and said portions on the auxiliary yoke lying between said rollback and said lugs and forwardly of the latter whereby inward pressure on said bolt when the latter is dogged will effect engagement of the bolt with said dogging member before effecting movement of the auxiliary yoke.

7. In a door lock, a case, a latch bolt reciprocably mounted in the case, a bifurcated yoke connected to said bolt, said yoke having lugs at a rear portion thereof, a dogging member pivotally mounted in the case and adapted to engage the bolt to dog the same against retraction when the door is closed, an auxiliary yoke slidably mounted in the case adjacent said bolt yoke and having portions in front of said lugs, knob-operated rollbacks in the case adapted to engage said last-named portions to move said bolt yoke and said auxiliary yoke rearwardly to retract the bolt, said auxiliary yoke having a part engaging the dogging member to move it to inoperative position, and said bolt yoke having a limited movement rearwardly independently of said auxiliary yoke before the bolt engages said dogging member whereby the latter yoke cannot be moved by inward pressure on the bolt when the latter is dogged.

8. In a door lock, a case, a latch bolt reciprocably mounted therein, inner and outer coaxial independently rotatable spindles, a knob upon each of said spindles, means for dogging the outer knob against operation, a key-operated lock mounted in the outer knob, means connecting each of said spindles to the bolt for operating the latter, said outer spindle being hollow, a member rigidly secured to the inner spindle and extending through, and threadedly connected with, the outer spindle for connection with said lock whereby the latter may operate the inner spindle when the outer knob is dogged, and said key-operated lock having a slidable connection with said member.

HENRY G. VOIGHT.